United States Patent [19]

Esch

[11] Patent Number: 4,793,140

[45] Date of Patent: Dec. 27, 1988

[54] INTERNAL COMBUSTION ENGINE WITH AT LEAST ONE TURBOCHARGER

[75] Inventor: Hans-Joachim Esch, Heimsheim, Fed. Rep. of Germany

[73] Assignee: Dr. Ing. h.c.F. Porsche Aktiengesellschaft, Fed. Rep. of Germany

[21] Appl. No.: 72,784

[22] Filed: Jul. 13, 1987

[30] Foreign Application Priority Data

Jul. 12, 1986 [DE] Fed. Rep. of Germany ....... 3623541

[51] Int. Cl.$^4$ ............................................. F02B 37/12
[52] U.S. Cl. ........................................ 60/600; 60/612
[58] Field of Search ................. 60/600, 601, 602, 603, 60/612

[56] References Cited

U.S. PATENT DOCUMENTS

| 4,459,808 | 7/1984 | Rydquist et al. | 60/602 |
| 4,528,815 | 7/1985 | Arnaud | 60/600 |
| 4,709,552 | 12/1987 | Rutschmann et al. | 60/600 |

FOREIGN PATENT DOCUMENTS

| 2549934 | 5/1977 | Fed. Rep. of Germany. |
| 3032218 | 3/1982 | Fed. Rep. of Germany. |
| 3126365 | 4/1982 | Fed. Rep. of Germany. |

Primary Examiner—Michael Koczo
Attorney, Agent, or Firm—Barnes & Thornburg

[57] ABSTRACT

An internal combustion engine equipped with at least one exhaust gas turbocharger whose compressor is connected by way of a charging pressure line to a suction manifold of the engine and whose turbine is inserted into an exhaust gas line coming from an exhaust gas manifold. A controllable blow-off valve (waste gate) is installed into a by-pass line coming from the exhaust gas line and by-passing the turbine while the compressor is adapted to be short-circuited by way of a vent valve. During the transition of the internal combustion engine into the coasting operation, the blow-off valve is activated into the closed condition for at least a limited time span. A loss of exhaust gas energy during a shifting operation is avoided thereby so that the internal combustion engine accelerates more rapidly after termination of the shifting operation.

10 Claims, 3 Drawing Sheets

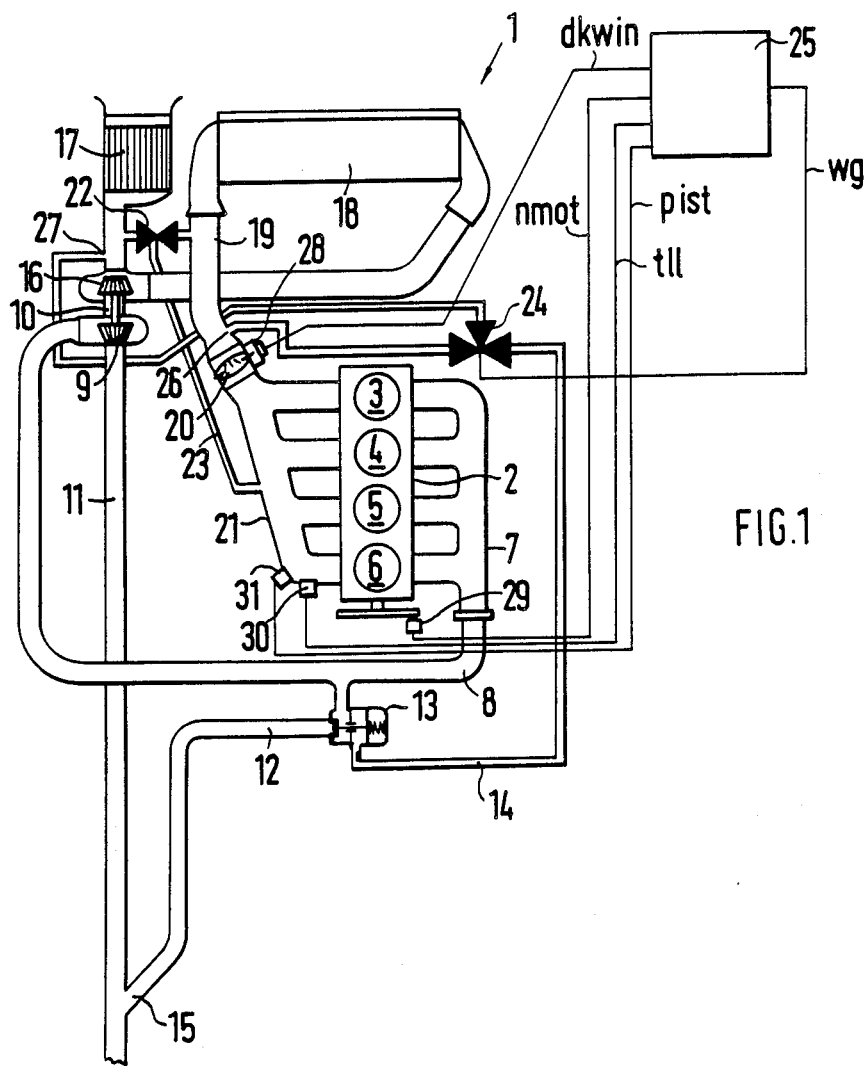
FIG.2   tvh = f(nmot, dkwin)

| tvhkf | | | | |
|---|---|---|---|---|
| 200 | | | | ⎫ |
| 199 ⋮ 101 | tvh − 100 | | | ⎬ |
| 100 | auf | | | ⎬ |
| 99 ⋮ 1 | | tvh | | ⎬ |
| 0 | | | | ⎭ |

FIG.4

| | | dkwin/(°) → | | | | | |
|---|---|---|---|---|---|---|---|
| | | 3 | 4 | 25 | 45 | 60 | 80 |
| nmot/ (U/m) ↓ | 2000 | 200 | 100 | 100 | 120 | 160 | 200 |
| | 3000 | 200 | 100 | 130 | 140 | 165 | 180 |
| | 3300 | 200 | 100 | 115 | 145 | 160 | 180 |
| | 3680 | 200 | 100 | 120 | 140 | 155 | 180 |
| | 4000 | 200 | 100 | 110 | 130 | 150 | 175 |
| | 4280 | 100 | 0 | 30 | 40 | 50 | 55 |
| | 5000 | 100 | 0 | 0 | 10 | 30 | 40 |
| | 6000 | 100 | 0 | 0 | 10 | 25 | 35 |
| | 7000 | 100 | 0 | 0 | 0 | 20 | 30 |
| | 8000 | 100 | 0 | 0 | 0 | 0 | 0 |

FIG.5
tvhkf = f(nmot, dkwin)

INTERNAL COMBUSTION ENGINE WITH AT LEAST ONE TURBOCHARGER

BACKGROUND AND SUMMARY OF THE INVENTION

The present invention relates to an internal combustion engine with at least one turbocharger consisting of a turbine and of a compressor whose compressor is connected by way of a charging pressure line to a suction manifold of the internal combustion engine and whose turbine is connected into an exhaust gas line coming from an exhaust gas manifold and in which a controllable blow-off valve (waste gate) is installed into a by-pass line by-passing the turbine and coming from the exhaust gas manifold while the compressor is adapted to be short-circuited by way of a vent valve.

By equipping internal combustion engines with exhaust gas turbochargers, it is possible to gain back at least a part of the lost energy present in the exhaust gases and to feed the same back to the internal combustion engine. However, as the supercharged air quantity supplied by the exhaust gas turbocharger and therewith the charging pressure assumes sufficient values only with a larger exhaust gas flow (i.e , at higher values of engine load and engine rotational speed and additionally increases strongly with increasing exhaust gas flow, the charging pressure has to be regulated and/or controlled for attaining a good dynamic behavior of the internal combustion engine and for avoiding its destruction.

This takes place as a rule by a pneumatically controlled blow-off valve (by-pass valve) which is acted upon by the charging pressure and is located in a by-pass channel (by-pass) with respect to the turbine of the exhaust gas turbocharger and thus reduces the exhaust gas flow through the turbine at excessively high charging pressures.

If, however, an output control device (throttle valve) of the internal combustion engine is suddenly no longer actuated at relatively high load, for example, for changing a driving point (transmission speed) of a motor vehicle equipped with this internal combustion engine, then a pressure shock occurs upstream of the throttle valve because the exhaust gas turbocharger at first continues to supply charging air; as a result thereof, devices in the suction path of the internal combustion engine such as, for example, throttle valve or air-quantity measuring device may be destroyed under certain circumstances. In order to avoid this, it was proposed in the DE-OS No. 32 46 483 to open the blow-off valve with a closed throttle valve.

However, this entails the disadvantage that the rotational speed of the turbocharger decreases strongly during the transition into the coasting operation, for example, during the change of the driving point so that the energy lost therewith is missing for the re-acceleration of the internal combustion engine after completed change of the driving point.

It is therefore the object of the present invention to far-reachingly avoid a loss of kinetic energy in an exhaust gas turbocharger of an internal combustion engine during the transition into the coasting operation and nonetheless to reliably protect the internal combustion engine inclusive all of its auxiliary aggregates against overload due to excessively high charging pressures.

The underlying problems are solved according to the present invention in that the blow-off valve is activated into the closed condition at least for a limited time interval during the transition of the internal combustion engine into the coasting operation.

The advantages of the present invention reside in the first instance in that during the transition into the coasting operation a loss of kinetic energy of the exhaust gas turbocharger is far-reachingly avoided during the transition into the coasting operation by the activation of the blow-off valve into its closed condition. By including an atmospheric air valve in a by-pass to the compressor which opens at vacuum in the suction manifold of the internal combustion engine and at excessively high charging pressures, pressure shocks in the suction path of the internal combustion engine are additionally dampened.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a schematic view of an exhaust gas turbocharger installation of a multi-cylinder internal combustion engine in accordance with the present invention;

FIG. 2 is a quanticized and digitalized pulse duty factor-anticipatory control-performance graph in accordance with the present invention illustrated as table;

FIG. 4 is a table with a coordination of pulse duty factor values to operating ranges; and FIG. 5 is a table similar to FIG. 2, but for the turbocharger installation according to FIG. 3.

DETAILED DESCRIPTION OF THE DRAWINGS

Figure 3:
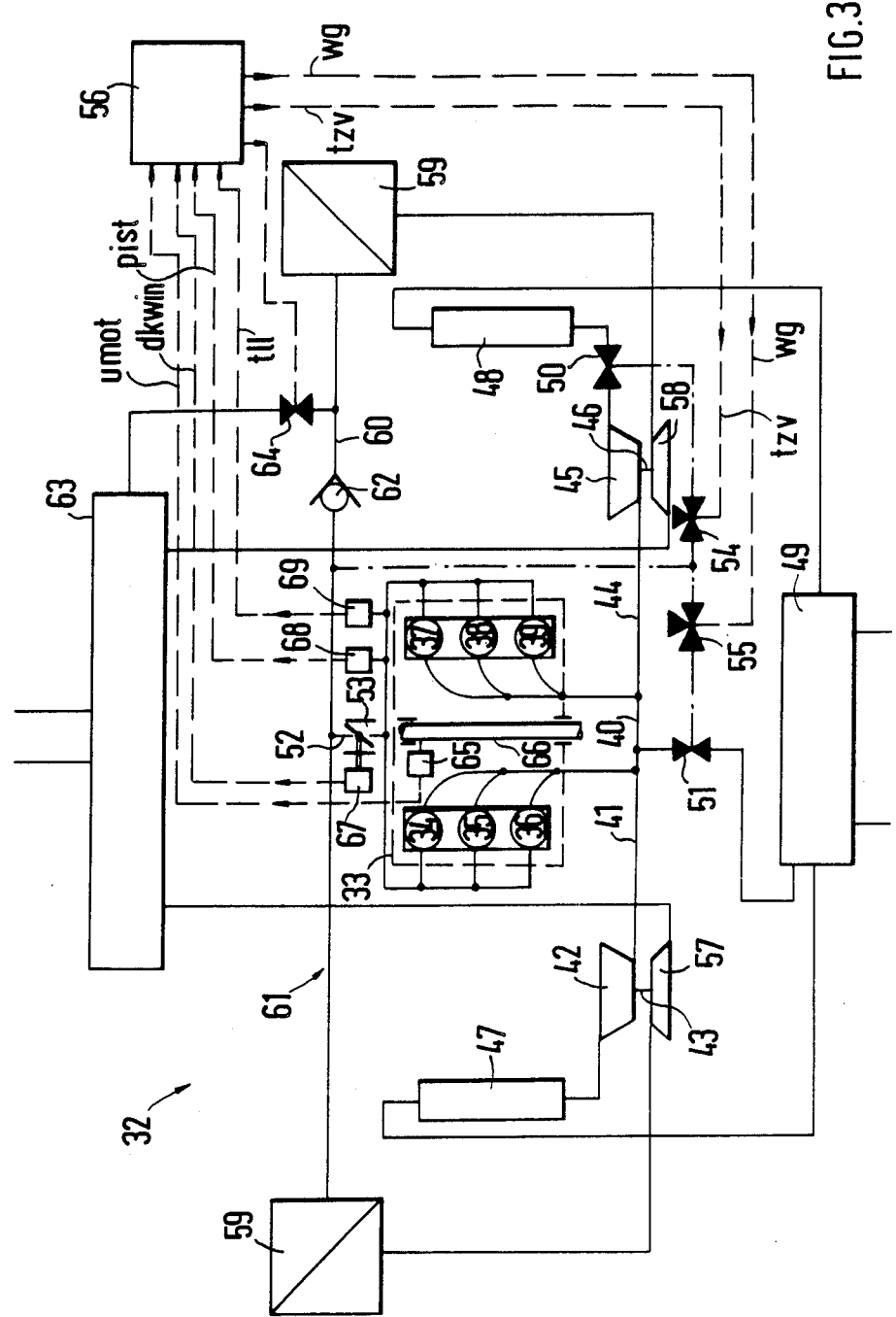
FIG. 3 is a schematic view, similar to FIG. 1, of a modified embodiment in accordance with the present invention for a turbocharger installation.

Referring now to the drawing wherein like reference numerals are used throughout the various views to designate like parts, and more particularly to FIG. 1, reference numeral 1 generally designates an exhaust gas turbocharger installation for an internal combustion engine 2. Exhaust gas pipes from the cylinders 3 to 6 terminate in the common exhaust gas manifold 7, from which starts an exhaust gas line 8 for the drive of a turbine 9 of an exhaust gas turbocharger 10. The outlet of the turbine 9 leads by way of a pipe line 11 into an exhaust system (not shown) which may include mufflers and/or catalysts.

A by-pass line 12 branches off from the exhaust gas line 8. A controllable blow-off valve 13 (waste gate) is inserted into the by-pass line 12 which is pneumatically controllable by way of a first control line 14. The by-pass line 12 finally terminates in the pipe line 11 at a branching point 15.

The compressor 16 driven by the turbine 9 sucks in air by way of an air filter 17 and supplies charging air by way of a charging air cooler 18, a charging pressure line 19 and an output control device (throttle valve 20) to a suction manifold 21, from which it is uniformly distributed onto the cylinders 3 to 6.

The compressor 16 is finally adapted to be short-circuited by way of a vent valve 22 in order to prevent an operation of the exhaust gas turbocharger 10 at or above the pump limit. The vent valve 22 is controlled in a known manner by way of a second control line 23 which connects the control input of the vent valve 22 with the suction manifold 21. It opens insofar as a vacuum results in the suction manifold 21 or the pressure in the charging pressure line 19 becomes excessive.

A cyclically operated control valve 24 is inserted into the first control line 14 which is activated by way of a control apparatus 25 and which connects the first control line 14 either with a pressure take-off place 26 in the charging pressure line 19 upstream of the throttle valve 20, respectively, upstream of the charging air cooler 18, or with atmospheric pressure, respectively, a pressure take-off place 27 upstream of the compressor inlet.

The control valve 24 is activated with a pulse duty factor tvh by way of a signal wg which is being readied by the control apparatus 25. The pulse duty factor, respectively, the repetition frequency thereof is thereby so selected that the blow-off valve 13 controlled by the control valve 24 is continuously adjustable in its entire operating range from 0% to 100% in the opening, respectively, closing direction.

For determining the pulse duty factor tvh the control apparatus 25 determines by means of a throttle valve sensor 28 the position of the throttle valve (throttle valve angle dkwin), by means of a rotational speed sensor 29 the rotational speed nmot of the internal combustion engine 2, by means of a charging pressure sensor 30 a charging pressure pist and by means of a temperature sensor 31 the charging air temperature tll.

In the control apparatus 25, the pulse duty factor tvh is determined from the rotational speed nmot and the throttle valve angle dkwin by way of a pulse duty factor-anticipatory control-performance graph tvh=f(nmot, dkwin) (family of characteristic curves), for which an example is illustrated in FIG. 2. A charging pressure-dependent regulation and/or a charging air-dependent correction may be superimposed on this anticipatory control as is described, for example, in the DE-OS No. 31 29 686. However, in the instant case, only an anticipatory control is to be considered whence the signal wg is to be set identical to the pulse duty factor tvh.

For safety reasons, the exhaust gas turbocharger installation is so designed that the control valve 24 connects in the non-activated condition (tvh=0) the control line 14 and therewith the blow-off valve 13 with the pressure take-off place 26 upstream of the throttle valve 20. It is assured thereby that the exhaust gas turbocharger installation, respectively, the internal combustion engine is not damaged also in case of failure of the control apparatus 25 or of the control valve 24 because the blow-off valve 13 reliably opens with increasing charging pressure and nonetheless an emergency operation of the internal combustion engine is assured.

In the completely activated condition (tvh=100), the control valve 24 connects the control line 14, by contrast, with the pressure take-off place 27 at the compressor inlet, respectively, with atmospheric pressure so that the blow-off valve 13 is closed. Owing to the cyclic or clock-controlled manner of operation of the control valve 24, theoretically every position of the blow-off valve 13 from the fully opened to the fully closed position is thus adapted to be activated. An opening of the blow-off valve 13, however, is possible only insofar as the pressure level at the take-off place 26 upstream of the throttle valve 20 is sufficiently high in order to lift the valve disk of the blow-off valve which is held closed against spring force, from its seat.

During idling of the internal combustion engine, respectively, at low load, this pressure level, however, is not reached because the feed quantity of an exhaust gas turbocharger is too small thereat. For that reason, it does not appear either logical or meaningful to activate the control valve 24 with non-actuated throttle valve 20; customarily the lowest rotational speed characteristic curve (dkwin=constant=minimum=3°) is therefore set in the pulse duty factor- anticipatory control-performance graph tvh=f(nmot, dwwin) with the pulse duty factor tvh=0.

During the transition of the internal combustion engine into the coasting operation (closing of the throttle valve), for example, during a shifting operation, the exhaust gas turbocharger initially still continues to feed charging air against the closed throttle valve 20 so that a pressure shock occurs ahead of it. This pressure shock continues by way of the (non-activated) control valve 24 into the control line 14 so that the blow-off valve 13 is pressed completely open and valuable energy in the exhaust gas is lost by way of the by-pass line 12.

However, this energy is again urgently needed by the exhaust gas turbocharger 10 for the re-acceleration of the internal combustion engine after termination of the shifting operation. According to the present invention, the blow-off valve 13 is therefore activated into its closed position in that the control valve is activate fully with a pulse duty factor tvh =100 so that it connects the control line 14 with the atmosphere.

The pulse duty factor- anticipatory control- performance graph tvh=f(nmot, dkwin) according to FIG. 2 therefore includes in its lowest rotational speed characteristic curve dkwin=constant=minimum=3° the pulse duty factor value tvh=100.

The pressure shock which occurs upstream of the throttle valve 20 is dampened as already described above, by way of the vent valve 22, respectively, is limited in its magnitude because during the closing of the throttle valve 20 a vacuum results downstream of the same which opens the vent valve 22 (by way of the second control line 23).

The turbocharger installation 32 for an internal combustion engine 33 which is illustrated in FIG. 3 is more fully described in the DE-OS No. 34 20 015 and in a German application filed by the assignee of the present application on the same date under the title "Multicylinder-Internal Combustion Engine With Two Exhaust Gas Turbochargers" as the priority application of the present application (German Application P 36 23 540.7, filed in Germany July 12, 1986, corresponding to U.S. patent application Ser. No. 072,755, filed July 13, 1987) so that reference will be made hereinafter only briefly to the construction of the manner of operation in principle and the particularity according to the present invention in the activation of exhaust gas valves in the coasting operation.

Pneumatic lines are thereby indicated in full lines, pneumatic control lines in dash and dotted lines and electric lines in dash lines. Cylinders 34 to 39 are subdivided (in a non-necessary manner) into two groups. The exhaust gas pipes from the cylinders terminate in a common exhaust gas manifold 40 from which starts an exhaust qaL line 41 for the drive of a turbine 42 of a first exhaust gas turbocharger 43 and a further exhaust gas line 44 for the drive of a turbine 45 of a second exhaust gas turbocharger 46. The outlet of the turbines 42 and 45 can be conducted either by way of auxiliary mufflers 47, 48, respectively, catalysts or also directly by way of pipe lines to a main muffler 49.

A switch-in valve 50 is connected into the exhaust gas line 44 of the turbine 45 which may be arranged either upstream or also downstream of the turbine 45. Furthermore, the exhaust gas manifold 40 is connected with the main muffler 49 by way of a blow-off valve (waste gate) 51. The switch-in valve 50 and the blow-off valve 51 are pneumatically actuated valves which are opened in the non-activated condition. Pneumatic auxiliary energy which is taken off from a suction manifold 52 upstream of a power output control device (throttle valve) 53 is fed to the valves 50 and 51 by way of control valves 54 and 55 coordinated to the same.

The electrically operated control valves 54 and 55 are acted upon with a pulse duty factor by a control apparatus 56 valve 51 in the non-activated condition with the atmosphere. More accurately stated, a control space of the switch-in valve 50, respectively, of the blow-off valve 51 is connected corresponding to the existing pulse duty factor more or less with a pressure medium of high pressure (by way of the pressure take-off Place in the suction manifold 52 upstream of the throttle valve 53), respectively, with a pressure medium of low pressure, for example, of the atmosphere, whereby in the non-activated condition of the control valves 54 and 55 the control space is at atmospheric pressure. For the sake of simplicity, however, such a consideration was dispensed with in FIG. 1.

The compressors 57 and 58 driven by the turbines 42 and 45 supply compressed air by way of charging air coolers 59 to the suction manifold 52; the charging air is distributed from the suction manifold 52 uniformly onto the individual suction pipes to the cylinders 44 to 39. A check valve 62 as is described more fully in the DE-OS No. 34 20 015 is installed in a partial section 60 of a charging air line 61. A vent valve 64 is connected into a by-pass with respect to the compressor 58 which connects the partial section 60 of the charging air line with an air filter 63; the vent valve 64 is adapted to be controlled by way of the control apparatus 56.

Finally, the control apparatus 56 additionally receives signals from a rotational speed sensor 65 (rotational speed nmot of the crankshaft 66 of the internal combustion engine 33), from a throttle valve position sensor 67 (position of the throttle valve 53, throttle valve angle dkwin), from a suction pipe pressure sensor 68 (suction pipe pressure pist in the suction manifold 52, downstream of the throttle valve) and from a temperature sensor 69 (charging air temperature tan). The control apparatus 56 converts these signals into corresponding activating signals for the control valves 54 and 55 of the switch-in valve 50 and of the blow-off valve 51 an for the vent valve 64.

The function of the switch-in valve 50 and of the blow-off valve 51 can be explained as follows:

The switch-in valve 50 enables a continuously adjustable admission of the second exhaust gas turbocharger 46 with exhaust gas and an acceleration of its compressor shaft. The exhaust gas quantity flowing off across the turbocharger 46 reduces at the same time the exhaust gas quantity flowing to the first exhaust gas turbocharger 43 so that the function of the switch-in valve 50—with respect to the first exhaust gas turbocharger 43—corresponds to that of a waste gate (blow-off valve) with a singly supercharged engine, i.e., with an engine supercharged with a single turbocharger. The waste gate is a common blow-off valve for both exhaust gas turbochargers 43 and 46.

The activation of the switch-in valve 50, respectively, of the blow-off valve 51 takes place in such a manner that a closing degree (100% corresponding to the closed condition of the switch-in and of the blow-off valve) is determined by the (cyclically operated or clock-controlled) pulse duty factor existing at the respective control valve (with constant clock frequency); the control range therefore lies thereby between 0% and 100%. An activation of the two valves with a pulse duty factor deviating from 0%, respectively, 100% (non-activated, respectively, fully activated) takes place for both valves in principle alternatively, i.e., there is no condition point of the internal combustion engine 33 in which both valves are simultaneously acted upon with such a pulse duty factor.

The possibility results therefrom to represent the condition of both valves unequivocally by only one reference numeral, a "pulse duty factor tvhkf" with the range 0 to 200 (see FIG. 4): In the range from 0 to 100 tvhkf represents directly the pulse duty factor (second pulse duty factor wg) for the blow-off valve 51. Within the range between 100 and 200, the pulse duty factor (first pulse duty factor tzv) for the switch-in valve 50 results from tvhkf by subtraction of 100. The blow-off valve is fully activated in this range, i.e., closed.

Thus, only one performance graph is needed for both valves; a numerically continuous transition of the activation from one valve to the other will thus result so that additionally a possibly superimposed regulation is simplified. The range of tvhkf>100 up to tvhkf=200 will be referred to hereinafter as "one-supercharger-operation" (also when the second supercharger already starts to operate thereat) and the range of tvhkf=0 to tvhkf=100 will be referred to as "two-supercharger-operation".

The determination of the pulse duty factor anticipatory control value tvhkf takes place, as already described hereinabove, by way of a performance graph tvhkf =f(nmot, dkwin from the rotational speed nmot and the throttle valve angle dkwin. An example for a pulse duty factor-anticipatory control- performance graph can be seen in FIG. 5.

A further problem occurs during tee shifting operation by the transition from high load to coasting (throttle valve 53 not activated): a high pressure occurs thereby for a short period of time i the charging air line, as in the conventional turbocharger installation according to FIG. 1, upstream of the throttle valve 53—the take-off place for the auxiliary pressure is located thereat. If now a pulse duty factor tvhkf=100 exists for rotational speeds nmot below a rotational speed limit value for the shifting over into the two-supercharger-operation, then the turbine switch-in valve is suddenly pressed fully open, as a result of which the first exhaust gas turbocharger 43 loses rapidly in energy. The same is true above this rotational speed limit value, i.e., in the two-supercharger-operation; a pulse duty factor tvhk=0 would mean thereat that the blow-off valve opens and thus valuable energy is lost to both exhaust gas turbochargers.

The pulse duty factor-anticipatory control-performance graph according to FIG. 5 therefore includes according to the present invention the following peculiarities: each rotational speed characteristic line nmot =constant carries out at the lower end of the value range of the throttle valve angle dkwin a steep jump in the pulse duty factor-performance graph value tvhk. The pulse duty factor-performance graph value tvhk will be fixed thereat for rotational speeds which lie below the rotational speed limit value for the switching over into the two-supercharger-operation, at its maximum value tvhk=200 and is set for rotational speeds which lie above this limit value, to the value of the switch-in point tvhk =100.

The control apparatus 25 and 56 are constructed according to conventional microcomputer techniques and include essentially a single chip microcomputer or a microprocessor, for example, of the type 8031 of Intel, volatile and non-volatile memories, analog and digital input and output components as well as matching and driver components. Individual regulating and control modules are realized as software and are stored together with the quanticized and digitalized performance graph detected at reset points in the non-volatile memories.

The suction pipe pressure pist, the charging air temperature tll, the rotational speed nmot and the throttle valve angle dkwin are detected analog or digital or can be made available to the control apparatus 25, respectively, 56 possibly also from a motor-management computer. Analog magnitudes are thereby converted by way of A/D converters into signals utilizable for the microprocessors. Of course, the control apparatus can also be built of analog/digital components/chips.

While I have shown and described only two embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An internal combustion engine, comprising at least one turbocharger including a turbine and a compressor whose compressor is operatively connected by way of a charging pressure line with an intake manifold of the internal combustion engine and whose turbine is operatively connected into an exhaust gas line coming from an engine exhaust gas manifold, a by-pass line coming from the exhaust gas manifold and by-passing the turbine, a controllable blow-off valve means in said by-pass line, vent valve means for short-circuiting the compressor, engine throttle valve means for controlling the supply of fuel and air to the engine intake manifold, engine speed detecting means for detecting the engine speed, and blow-off valve control means for controlling the blow-off valve means such that the blow-off valve means is moved to a closed position for a limited time interval during transitional operation of the engine with the engine throttle valve means closed and the speed of the engine above a predetermined value, whereby the charging pressure of the turbocharger is maintained substantially unchanged during vehicle shifting operations.

2. An internal combustion engine according to claim 1, herein the blow-off valve means is a waste gate.

3. An internal combustion engine according to claim 1, wherein the flow-off control means is operated by means of pneumatic auxiliary energy, a first control line serving for the supply of the auxiliary energy to the blow-off valve means being operatively connected by a control valve with one of a pressure take-off place in a charging air line upstream of the throttle valve means and a pressure take-off place upstream of the compressor inlet, said control valve being operable to effect a closing of the blow-off valve means when said throttle valve means is in a closed position.

4. An internal combustion engine according to claim 3, wherein the blow-off valve means is closed in its non-activated condition and the control valve opens the first control line towards the atmosphere with a closed throttle valve means.

5. An internal combustion engine according to claim 3, wherein the control valve is subjected to a performance graph control means dependent on operating parameters of the internal combustion engine including at least engine rotational speed supplied by the engine speed detecting means and the position of the throttle valve means, the performance graph of the performance graph control means being so designed that with a closed throttle valve means the closing of the blow-off valve means is effected by the control valve.

6. An internal combustion engine according to claim 4, wherein the control valve is controlled by way of a control apparatus by means of a pulse duty factor signal which is determined in the control apparatus in dependence on at least one of the position of the throttle valve means, the rotational speed of the internal combustion engine, the charging pressure and the charging air temperature.

7. An internal combustion engine according to claim 3, wherein the vent valve means is operable to automatically relieve the pressure shock which builds up in the charging air line during the closing of the throttle valve means upstream thereof.

8. An internal combustion engine according to claim 5, wherein the vent valve means is operable to automatically relieve the pressure shock which builds up in the charging air line during the closing of the throttle valve means upstream thereof.

9. An internal combustion engine according to claim 1, which is equipped with at least two exhaust gas turbochargers each including a turbine and a compressor driven by the turbine, whose compressors are operatively connected by way of separate charging air lines with a common engine intake manifold and whose turbines are connected into separate exhaust gas lines coming from an engine exhaust gas manifold, and in which one exhaust gas turbocharger is adapted to be switched-in addition to the other exhaust gas turbocharger during the operation of the internal combustion engine, the controllable blow-off valve means being operatively connected into a by-pass line coming from the exhaust gas manifold and by-passing the turbines of the exhaust gas turbochargers, a switch-in valve means being operatively connected into the exhaust gas line of the turbine of the exhaust gas turbocharger adapted to be switched-in, a check valve being operatively connected into the charging air line of the compressor of the exhaust gas turbocharger adapted to be switch-in which is operable to open by the pressure building up in the charging air line after the opening of the switch-in vale means, the blow-off valve means and the switch-in valve means being controllable in dependence on condition magnitudes of the internal combustion engine detected by sensor means by means of electronic control means, the activation of the blow-off valve means and of the switch-in valve means being subjected to at least one condition dependent anticipatory control whereby during the transition into the operation with a closed throttle valve means below a predetermined engine speed, the switch-in valve means and the blow-off valve means are activated into the closed condition insofar as at the preceding operating point the blow-off valve means was closed and the switch-in valve means was in the partially open condition, and the switch-in valve means is activated into the open condition and the blow-off valve means into the closed condition insofar as in the preceding operating point the switch-in valve means was fully opened and the blow-off valve means was at least partially open and the actual operating point was still in a range characterized for a one-supercharger-operation.

10. An internal combustion engine according to claim 9, wherein the switch-in valve means and the blow-off valve means are opened in their non-actuated condition and are actuated by pneumatic auxiliary energy taken off from the intake manifold upstream of the throttle valve means, to which the auxiliary energy is supplied by way of cyclically operated control valves which are closed in their non-activated condition, said control valves being controlled by the electronic control means by means of a pulse duty factor in dependence on at least one of the position of the throttle valve means, the rotational speed of the internal combustion engine, the charging pressure and the charging air temperature.

* * * * *